United States Patent
George et al.

(10) Patent No.: US 11,144,498 B2
(45) Date of Patent: Oct. 12, 2021

(54) DEFRAGMENTATION FOR OBJECTS WITHIN OBJECT STORE

(71) Applicant: NetApp Inc., Sunnyvale, CA (US)

(72) Inventors: Tijin George, Sunnyvale, CA (US); Jagavar Nehra, Bangalore (IN); Roopesh Chuggani, Bengaluru (IN); Dnyaneshwar Nagorao Pawar, Bangalore (IN); Atul Ramesh Pandit, Los Gatos, CA (US); Kiyoshi James Komatsu, San Mateo, CA (US)

(73) Assignee: NetApp Inc., San Jose, CA (US)

( * ) Notice: Subject to any disclaimer, the term of this patent is extended or adjusted under 35 U.S.C. 154(b) by 262 days.

(21) Appl. No.: 16/296,453

(22) Filed: Mar. 8, 2019

(65) Prior Publication Data

US 2020/0285612 A1  Sep. 10, 2020

(51) Int. Cl.
*G06F 16/11* (2019.01)
*G06F 16/907* (2019.01)
*G06F 16/14* (2019.01)

(52) U.S. Cl.
CPC ............ *G06F 16/128* (2019.01); *G06F 16/14* (2019.01); *G06F 16/907* (2019.01)

(58) Field of Classification Search
CPC ....... G06F 16/128; G06F 16/907; G06F 16/14
USPC ...................................................... 707/649
See application file for complete search history.

(56) References Cited

U.S. PATENT DOCUMENTS

| | | | |
|---|---|---|---|
| 6,128,623 A * | 10/2000 | Mattis | H04L 67/2842 711/118 |
| 6,209,003 B1 * | 3/2001 | Mattis | G06F 12/023 |
| 7,904,492 B2 | 3/2011 | Sarma et al. | |
| 8,352,431 B1 | 1/2013 | Protopopov et al. | |
| 8,515,911 B1 | 8/2013 | Zhou et al. | |
| 9,588,977 B1 | 3/2017 | Wang et al. | |
| 10,783,114 B2 | 9/2020 | Sarda et al. | |
| 2006/0173939 A1 * | 8/2006 | Yin | G06F 12/0253 |
| 2006/0294165 A1 * | 12/2006 | Bacon | G06F 12/0253 |
| 2011/0258461 A1 | 10/2011 | Bates | |
| 2014/0149794 A1 | 5/2014 | Shetty et al. | |
| 2015/0127623 A1 * | 5/2015 | Gracie | G06F 12/0253 707/693 |
| 2016/0142483 A1 | 5/2016 | Nallathambi et al. | |
| 2016/0170876 A1 * | 6/2016 | Chamberlain | G06F 12/0802 711/118 |
| 2018/0196817 A1 | 7/2018 | Maybee et al. | |

* cited by examiner

*Primary Examiner* — Joshua Bullock
(74) *Attorney, Agent, or Firm* — Cooper Legal Group, LLC

(57) ABSTRACT

Techniques are provided for managing objects within an object store. An object is maintained within an object store. The object comprises a plurality of slots. Each slot is used to store a unit of data accessible to applications hosted by remote computing devices. The object comprises an object header used to store metadata for each slot. A determination is made that the object is a fragmented object comprising an in-use slot of in-use data and a freed slot from which data was freed. The object is compacted to retain in-use data and exclude freed data as a rewritten object.

20 Claims, 10 Drawing Sheets

DEFRAGMENTATION FOR OBJECTS WITHIN OBJECT STORE

BACKGROUND

Many users utilize cloud computing environments to store data, host applications, etc. A client device may connect to a cloud computing environment in order to transmit data from the client device to the cloud computing environment for storage. The client device may also retrieve data from the cloud computing environment. In this way, the cloud computing environment can provide scalable low cost storage.

Some users and businesses may use or deploy their own primary storage systems such as clustered networks of nodes (storage controllers) for storing data, hosting applications, etc. A primary storage system may provide robust data storage and management features, such as data replication, data deduplication, encryption, backup and restore functionality, snapshot creation and management functionality, incremental snapshot creation, etc. However, storage provided by such primary storage systems can be relatively more costly and less scalable compared to cloud computing storage. Thus, cost savings and scalability can be achieved by using a hybrid of primary storage systems and remote cloud computing storage. Unfortunately, the robust functionality provided by primary storage systems is not compatible with cloud computing storage, and thus these features are lost such as compression and deduplication otherwise provided by a primary storage system.

DETAILED DESCRIPTION

Figure 1:
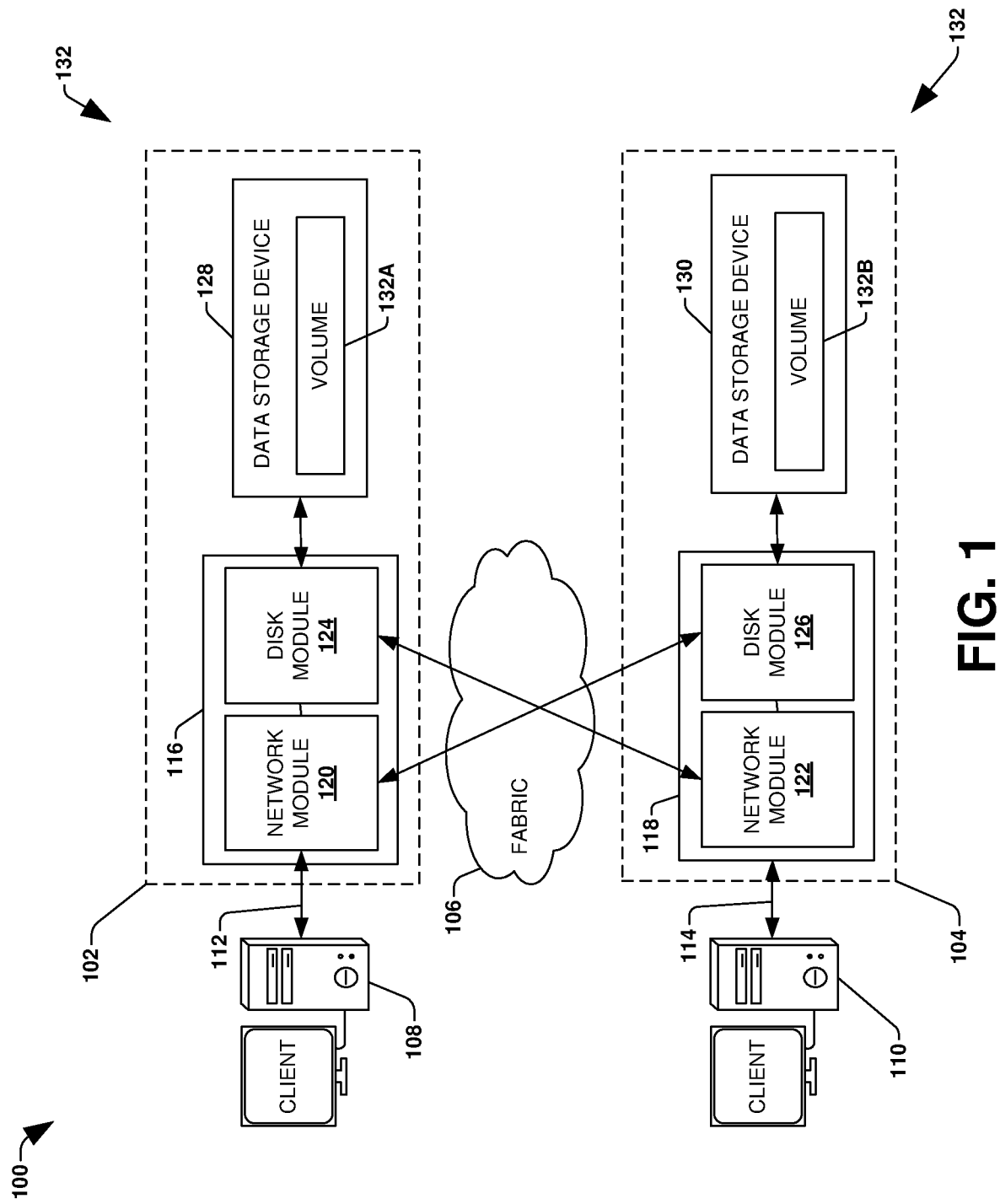
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Many users want primary storage system services, such as data replication, data deduplication, encryption, backup and restore functionality, snapshot creation and management functionality, etc. to be compatible with cloud storage provided by a cloud storage environment. In an example, primary data accessed by client devices may be stored within a primary storage system and secondary data (e.g., replicated primary data and snapshot data) may be stored in the cloud storage environment (e.g., an object store) in order to reduce an overall total cost of ownership of the secondary data because cloud storage is more cost effective than primary storage. However, many primary storage system services are incompatible with the cloud storage environment, and thus such features are unavailable.

Accordingly, methods and systems are provided herein that may provide various primary storage system services for a cloud storage environment in order to achieve efficient space and resource management, and flexible scaling in cloud. Additionally, this invention provides pseudo read only snapshots in cloud. Consumers of these snapshots may choose to derive just the logical data represented by these snapshots or can additionally derive additional metadata associated with the logical data if required. This additional metadata is created post snapshot creation and hence is not directly part of the logical view of the snapshot. The present system provides flexible, scalable, and cost effective techniques for leveraging cloud storage for off-premises operations on secondary data, such as analytics, development testing, virus scan, load distribution, etc. The present system provides the ability to modify cloud objects (e.g., a unit of storage within a cloud storage environment) without changing the meaning or accessibility of useable data in the cloud objects (e.g., a cloud object comprising a snapshot copy of primary data maintained in a primary storage system). The present system provides the ability to modify cloud objects to add additional metadata and information such as analytics data, virus scan data, etc. to useable data without modifying the useable data. Thus, a cloud object is maintained as a pseudo read only object because in-use data is unmodifiable while unused or freed data is modifiable such as by a defragmentation and/or garbage collection process to remove the freed data.

The present system provides the ability to detect changes in cloud objects in order to resolve what data of the cloud objects is the correct data. That is, when a certain cloud object is overwritten in the cloud storage environment to include new information, a client device reading that cloud object may get the old or new copy of the data because of the eventual consistent nature of cloud buckets, and thus this system can resolve what data is the correct (e.g., new) data. The present system provides the ability to perform defragmentation and garbage collection for cloud objects by a cloud service hosted by the cloud storage environment. Defragmentation and garbage collection are provided without affecting access to other in-use data within cloud objects (e.g., in-use snapshot data stored within a cloud object that is used by one or more applications at various remote computers). This allows for more true distributed and infinite scale data management. The present system provides for the ability to run analytics on cloud objects (e.g., read/write analytics of data access to data within a cloud object) using analytic applications hosted within the cloud storage environment. The analytics can be attached to cloud objects even though the cloud objects are read only. The present system provides for deduplication of cloud objects. In this way, cloud objects can be modified while still maintaining consistency of in-use data within the cloud objects (e.g., maintaining consistency of a file system captured by a snapshot that is stored within a cloud object) and without compromising a read only attribute of the cloud objects. Also, computationally expensive processes like garbage collection, analytics, and defragmentation are offloaded from on-premises primary storage systems to cloud services within the cloud storage environment.

In one embodiment, objects within an object store (e.g., cloud objects within a cloud computing environment) can be maintained with a read only attribute such that data within objects can be overwritten/modified/freed so long as in-use data within the objects is not altered. In particular, an object may be maintained within an object store, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by a remote computing device is storing data of a snapshot of a local file system within a slot of an object, and thus the snapshot data is in-use until a particular event occurs such as the remote computing device deleting the snapshot). In an example, the object comprises snapshot data of a file system, a volume, a logical unit number (LUN), a file, or any other data of a remote computing device (a primary storage system). In this way, the object comprises a read only snapshot of data of the remote computing device. In one example, a plurality of objects corresponding to read only snapshots of the file system of the remote computing device are stored within the object store. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a remote computing device (a primary storage system). For example, an in-use slot may be a slot that comprises snapshot data (e.g., secondary/replicated data) of a snapshot created by a remote computing device. The slot becomes an unused slot when the data is no longer actively referenced, used, and/or maintained, such as where the remote computing device deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In an example, the additional data is generated by a cloud service or application executing within the cloud computing environment. This will offload processing and resource utilization that would otherwise be used by the remote computing device (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In an example, a second rule is enforced for the object. The second rule specifies that related read operations are to be directed to a same version of an object. For example, an object corresponds to secondary/replicated snapshot data of a file system maintained by a remote computing device. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data associated with object metadata. If the timestamp data between the related read operations (e.g., timestamp data read from object metadata by the read operations) is mismatched, then the related read operations are retried because the related read operations were executed upon different versions of the same object. If the timestamp data between the read operations matches, then the related read operations are considered successful. In an example, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store. The objects have a read only state, such that enforcement of the first rule ensures that in-use data within slots of an object is not modifiable, thus making objects pseudo read only objects because only unused slots can be modified/freed of unused data. In an example, an object is used to store data of a snapshot of a file system hosted by a remote computing device. The snapshot may be determined as being deleted by the remote computing device, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In an example, the garbage collection operation is executed by a cloud service in order to conserve resource consumption by the remote computing device (primary storage system) otherwise used to execute the garbage collection operation. The garbage collection operation free objects from the object store based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store that are related to snapshots of the file system are evaluated to determine whether the object is unique to the deleted snapshot and/or unique to only deleted snapshots (e.g., the object does not comprise data of active/undeleted snapshots). If so, then the object is freed from the object store. However, if the object is not unique to only deleted snapshot(s) such as where the object also stores data of an active/undeleted snapshot, then the object is not freed.

In an embodiment, defragmentation is provided for fragmented objects within the object store. In an example, defragmentation is implemented by a cloud service or application executing in the object store in order to conserve resources otherwise used by a remote computing device (primary storage system) that would execute defragmentation functionality. An object within the object store is determined to be a fragmented object based upon the object comprising at least one freed slot from which data was freed. For example, a freed slot may comprise an unused slot comprising unused data no longer referenced/used by a remote computing device (e.g., data of a deleted snapshot). Accordingly, the fragmented object may comprise one or more in-use slots of in-use data currently referenced/used by a remote computing device and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store.

As provided herein, an object file system is provided that is used to store, retrieve, and manage objects within an object store, such as a cloud computing environment. The object file system is capable of representing data in the object store in a structured format. It may be appreciated that any type of data (e.g., a file, a directory, an image, a storage virtual machine, a logical unit number (LUN), application data, backup data, metadata, database data, a virtual machine disk, etc.) residing in any type of computing device (e.g., a computer, a laptop, a wearable device, a tablet, a storage controller, a node, an on-premise server, a virtual machine, another object store or cloud computing environment, a hybrid storage environment, data already stored within the object store, etc.) using any type of file system can be stored into objects for storage within the object store. This allows the data to be represented as a file system so that the data of the objects can be accessed and mounted on-demand by remote computing devices. This also provides a high degree of flexibility in being able to access data from the object store, a cloud service, and/or a network file system for analytics or data access on an on-demand basis. The object file system is able to represent snapshots in the object store, and provides the ability to access snapshot data universally for whomever has access to an object format of the object file system. Snapshots in the object store are self-representing, and the object file system provides access to a complete snapshot copy without having to access other snapshots.

The object file system provides the ability to store any number of snapshots in the object store so that cold data (e.g., infrequently accessed data) can be stored for long periods of time in a cost effective manner, such as in the cloud. The object file system stores data within relatively larger objects to reduce cost. Representation of data in the object store is complete, such that all data and required container properties can be independently recovered from the object store. The object file system format ensures that access is consistent and is not affected by eventual consistent nature of underlying cloud infrastructure.

The object file system provides version neutrality. Changes to on-prem metadata versions provide little impact on the representation of data in the object store. This allow data to be stored from multiple versions of on-prem over time, and the ability to access data in the object store without much version management. The object file system provides an object format that is conducive to garbage collection for freeing objects (e.g., free slots and/or objects storing data of a delete snapshot), such as where a lower granularity of data can be garbage collected such as at a per snapshot deletion level.

In an embodiment, snapshots of data, such as of a primary volume, maintained by a computing device (e.g., a node, storage controller, or other on-prem device that is remote to the object store) can be created by the computing device. The snapshots can be stored in the object store independent of the primary volume and can be retained for any duration of time. Data can be restored from the snapshots without dependency on the primary volume. The snapshot copies in the object store can be used for load distribution, development testing, virus scans, analytics, etc. Because the snapshot copies (e.g., snapshot data stored within objects) are independent of the primary volume at the computing device, such operations can be performed without impacting performance of the computing device.

A snapshot is frozen in time representation of a filesystem. All the necessary information may be organized as files. All the blocks of the file system may be stitched together using cloud block numbers (e.g., a cloud block number comprises a sequence number of an object and a slot number of a slot within that object) and the file will be represented by a data structure (e.g., represented in a tree format of a tree structure) when stored into the object store within one or more objects. Using cloud block numbers, a next node within the tree structure can be identified for traversing the tree structure to locate a node representing data to be accessed. The block of the data may be packed into bigger objects to be cloud storage friendly, where blocks are stored into slots of a bigger object that is then stored within the object store. All the indirections (pointers) to reach leaf nodes of a file (e.g., user data such as file data is represented by leaf nodes within the tree structure) may be normalized and may be version independent. Every snapshot may be a completely independent copy and any data for a snapshot can be located by walking the object file system. While doing incremental snapshot copy, changed blocks between two snapshots may be copied to the object store, and unchanged blocks will be shared with previous snapshots as opposed to being redundantly stored in the object store. In this way, deduplication is provided for and between snapshot data stored within objects of the object store. As will be described later, an embodiment of a snapshot file system in the object store is illustrated by FIG. 4B.

Cloud block numbers are used to uniquely represent data (e.g., a block's worth of information from the computing device) in the object store at any point in time. A cloud block number is used to derive an object name (e.g., a sequence number) and an index (a particular slot) within the object. An object format, used by the object file system to format objects, allows for sharing of cloud blocks. This provides for storage space efficiency across snapshots so that deduplication and compression used by the computing device will be preserved. Additional compression is applied before writing objects to the object store and information to decompress the data is kept in the object header.

Similar to data (e.g., a file, directory, or other data stored by the computing device), metadata can be stored into objects. Metadata is normalized so that the restoration of data using the metadata from an object to a remote computing device will be version independent. That is, snapshot data at the computing device can be stored into objects in a version neutral manner. Snapshots can be mounted and traversed independent of one another, and thus data within an object is represented as a file system, such as according to the tree structure. The format of non-leaf nodes of the tree structure (e.g., indirects such as pointers to other non-leaf nodes or to leaf nodes of user data) can change over time. In this way, physical data is converted into a version independent format as part of normalization. Denormalization may be performed while retrieving data from the objects, such as to restore a snapshot. In an example of normalization, a slot header in an object has a flag that can be set to indicate that a slot comprises normalized content. Each slot of the object is independently represented. Slot data may comprise version data. The slot data may specify a number of entries within the object and an entry size so that starting offsets of a next entry can be calculated from the entry size of a current entry.

In an embodiment, denormalization of a first version of data/metadata (e.g., a prior version) can be retrieved from data backed up in an object according to a second version (e.g., a future version). In an example, if the future version added a new field, then during denormalization, the new field is skipped over. Denormalization of a future version can be retrieved from data backed up in an object according to a prior version. A version indicator in the slot data can be used to determine how of an entry is to be read and interpreted, and any missing fields will be set to default values.

In an embodiment of the object format of objects stored within the object store, relatively larger objects will be stored in the object store. As will be described later, an embodiment of an object is illustrated by FIG. 4C. An object comprises an object header followed by data blocks (slots). The object header has a static array of slot context comprising information used to access data for slots. Each slot can represent any length of logical data (e.g., a slot is a base unit of data of the object file system of the object store). Since data blocks for metadata are normalized, a slot can represent any length of logical data. Data within the slots can be compressed into compression groups, and a slot will comprise enough information for how to decompress and return data of the slot.

In an embodiment, storage efficiency provided by the computing device is preserved within the object store. A volume copied from the computing device into objects of the object store is maintained in the object store as an independent logical representation of the volume. Any granularity of data can be represented, such as a directory, a qtree, a file, or other data container. A mapping metafile (a VMAP) is used to map virtual block IDs/names (e.g., a virtual volume block number, a hash, a compression group name, or any other set of names of a collection of data used by the computing device) to cloud block numbers in the object store. This mapping metafile can be used to track duplicate data per data container for storage efficiency.

The mapping metafile enables duplicate data detection of duplicate data, such as a duplicate block or a compression group (e.g., a compressed group of blocks/slots within an object). The mapping metafile is used to preserve sharing of data within and across multiple snapshots stored within objects in the object store. The mapping metafile is used for sharing of groups of data represented by a unique name. The mapping metafile is used to populate indirect blocks with corresponding cloud block numbers for children nodes (e.g., compressed or non-compressed). The mapping metafile is used to help a garbage collector make decisions on what cloud block numbers can be freed from the object store when a corresponding snapshot is deleted by the computing device. The mapping metafile is updated during a snapshot copy operation to store snapshot data from the computing device into objects within the object store. An overflow mapping metafile can also be used, such as to represent entries with base key collision. The overflow mapping metafile will support variable length key and payload in order to optimize a key size according to a type of entry in the overflow mapping metafile.

The mapping metafile may be indexed by virtual volume block numbers or starting virtual volume block numbers of a compression group. An entry within the mapping metafile may comprise a virtual volume block number as a key, a cloud block number, an indication of whether the cloud block number is the start of a compression group, a compression indicator, an indicator as to whether additional information is stored in the overflow mapping metafile, a logical length of the compression group, a physical length of the compression group, etc. Entries are removed/invalidated from the mapping metafile if corresponding virtual volume block numbers are freed by the computing device, such as when a snapshot is deleted by the computing device.

The data structure, such as the tree structure, is used to represent data within an object. Each node of the tree structure is represented by a cloud block number. The key to the tree structure may uniquely identify uncompressed virtual volume block numbers, a contiguous or non-contiguous compression group represented by virtual volume block numbers associated with such, and/or an entry for non-starting virtual volume block numbers of the compression group to a starting virtual volume block number of the compression group. A key will comprise a virtual volume block number, a physical length of a compression group, an indicator as to whether the entry represents a start of the compression group, and/or a variable length array of virtual volume block numbers of either non-starting virtual volume block numbers or the starting virtual volume block number (if uncompressed then this is field is not used). The payload will comprise cloud block numbers and/or flags corresponding to entries within the mapping metafile.

Before transferring objects to the object store for an incremental snapshot, the mapping metafile is processed to clear any stale entries. This is to ensure that a stale virtual volume block number or compression group name is not reused for sharing (deduplication). In particular, between two snapshots, all virtual volume block numbers transitioning from a 1 to 0 (to indicate that the virtual volume block numbers are no longer used) in a snapshot to be copied to the object store in one or more objects are identified. Entries within the mapping metafile for these virtual volume block numbers transitioning from a 1 to 0 are removed from the mapping metafile. In this way, all entries using these virtual volume block numbers are invalidated.

As part of copying a snapshot to the object store, changed data and indirections for accessing the changed data are transferred (or all data for initialization). In particular, changed user data of the computing device is traversed through buftrees using a snapdiff operation to determine a data difference between two snapshots. Logical (uncompressed) data is read and populated into objects and associated with cloud block numbers. To preserve storage efficiency, a mapping from a unique name representing the logical data (e.g., virtual volume block number or a compression group name for compressed data) to a cloud block number (e.g., of a slot within which the logical data is stored) is recorded in the mapping metafile. Lookups to the mapping metafile will be performed to ensure only a single copy of changed blocks are copied to the object store. Metadata is normalized for version independency and stored into objects. Indirects (non-leaf nodes) are stored in the object to refer to unchanged old cloud blocks and changed new cloud blocks are stored in the object, which provides a complete view of user data and metadata for each snapshot. Inodes are written to the object store while pushing changed inofile blocks to the object store. Each inode entry within an inofile is normalized to represent a version independent inode format. Each inode will have a list of next level of indirect blocks (e.g., non-leaf nodes of the tree structure storing indirects/pointers to other nodes). Snapinfo objects comprise snapshot specific information. A snapinfo object of a snapshot has a pointer to a root of a snapshot logical file system. A root object for each primary volume (e.g., a primary volume for which a snapshot is captured) is copied to the object store. Each snapshot is associated with an object ID (sequence number) map that tracks which objects are in use in a snapshot (e.g., which objects comprise data of the snapshot) and is subsequently used for garbage collection in the future when a particular snapshot is deleted.

In an embodiment of data access and restoration, the tree format represents an object file system (a cloud file system) that can be mounted and/or traversed from any remote device utilizing APIs using a thin layer orchestrating between client requests and object file system traversal. A remote device provides an entry point to the object tree using a universal identifier (UUID) that is a common identifier for all object names for a volume (or container). A rel root object is derived from the UUID, which has pointers (names) to next level snapinfo objects. If a user is browsing a snapshot, a snapshot snapinfo is looked up within snapinfo objects. If no snapshot is provided, then latest snapshot info is used. The snapshot info has cloud block numbers for an inode file. The inode file is read from the object store using the cloud block number and an inode within the inode file is read by traversing the inode file's tree structure. Each level including the inode has a cloud block number for a next level until a leaf node (a level 0 block of data) is read. Thus, the inode for the file of interest is obtained, and the file's tree structure is traversed by looking up cloud block number for a next level of the tree structure (e.g., a cloud block number from a level 1 is used to access the level 0 block) until the required data is read. Object headers and higher level indirects are cached to reduce the amount of access to the object store. Additionally, more data may be read from the object store than needed to benefit from locality for caching. Data access can be used to restore a complete copy of a snapshot, part of a snapshot (e.g., a single file or directory), or metadata.

In an embodiment of read/write cloning, a volume or file, backed from a snapshot in the object store, is created. Read access will use a data access path through a tree structure. At a high level, write access will read the required data from the object store (e.g., user data and all levels of the file/volume tree that are part of user data modification by a write operation). The blocks are modified and the modified content is rewritten to the object store.

In an embodiment, defragmentation is provided for objects comprising snapshot copies in the object store and to prevent fragmented objects from being sent to the object store during backup. Defragmentation of objects involves rewriting an object with only used data, which may exclude unused/freed data no longer used by the computing device (e.g., data of a deleted snapshot no longer referenced by other snapshots). An object can only be overwritten if used data is not changed. Object sequence numbers are not reused. Only unused data can be freed, but used data cannot be overwritten. Reads will ensure that slot header and data are read from same object (timestamp checking). Reading data from the object store involves reading the header info and then reading the actual data. If these two reads go to different objects (as determined by timestamp comparison), then the read operation is failed and retried.

Defragmentation occurs when snapshots are deleted and objects could not be freed because another snapshot still contains some reference to the objects that would be freed (not all slots within these objects are freed but some still comprise used data from other snapshots). A slot within an object can only be freed when all snapshots referring to that slot are deleted (e.g., an oldest snapshot having the object in use such that younger snapshots do not reuse the freed slots). Also, ownership count can be persistently stored. When a snapshot is deleted, all objects uniquely owned by that snapshot are freed, but objects present in other snapshots (e.g., a next/subsequent snapshot) are not freed. A count of such objects is stored with a next snapshot so that the next snapshot becomes the owner of those objects. Defragmentation is only performed when a number of used slots in an object (an object refcount) is less than a threshold. If the number is below a second threshold, then further defragmentation is not performed. In order to identify used slots and free slots, the file system in the snapshot is traversed and a bitmap is constructed where a bit will be used to denote if a cloud block is in use (a cloud block in-use bitmap). This map is used to calculate the object refcount.

To perform defragmentation, the cloud block in-use map is prepared by walking the cloud snapshot file system. This bitmap is walked to generate an object refcount for the object. The object refcount is checked to see if it is within a range to be defragmented. The object is checked to see if the object is owned by the snapshot by comparing an object ID map of a current and a previous snapshot. If the object is owned and is to be defragmented, then the cloud block in-use map is used to find free slots and to rewrite the object to comprise data from used slots and to exclude freed slots. The object header will be updated accordingly with new offsets.

Fragmentation may be mitigated. During backup, an object ID map is created to contain a bit for each object in use by the snapshot (e.g., objects storing snapshot data of the snapshot). The mapping metafile (VMAP) is walked to create the object ID map. An object reference map can be created to store a count of a number of cloud blocks in use in that object. If the count is below a threshold, then data of the used blocks can be rewritten in a new object.

For each primary volume copied to the object store, there is a root object having a name starting with a prefix followed by a destination end point name and UUID. The root object is written during a conclude phase. Another copy for the root object is maintained with a unique name as a defense to eventual consistency, and will have a generation number appended to the name. A relationship state metafile will be updated before the root object info is updated. The root object has a header, root info, and bookkeeping information. A snapshot info is an object containing snapshot specific information, and is written during a conclude phase of a backup operation. Each object will have its own unique sequence number, which is generated automatically.

To provide for managing objects within an object store, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that managing objects within an object store may be implemented within the clustered network environment 100, such as where nodes within the clustered network environment store data as objects within a remote object store. It may be appreciated that managing objects within an object store may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
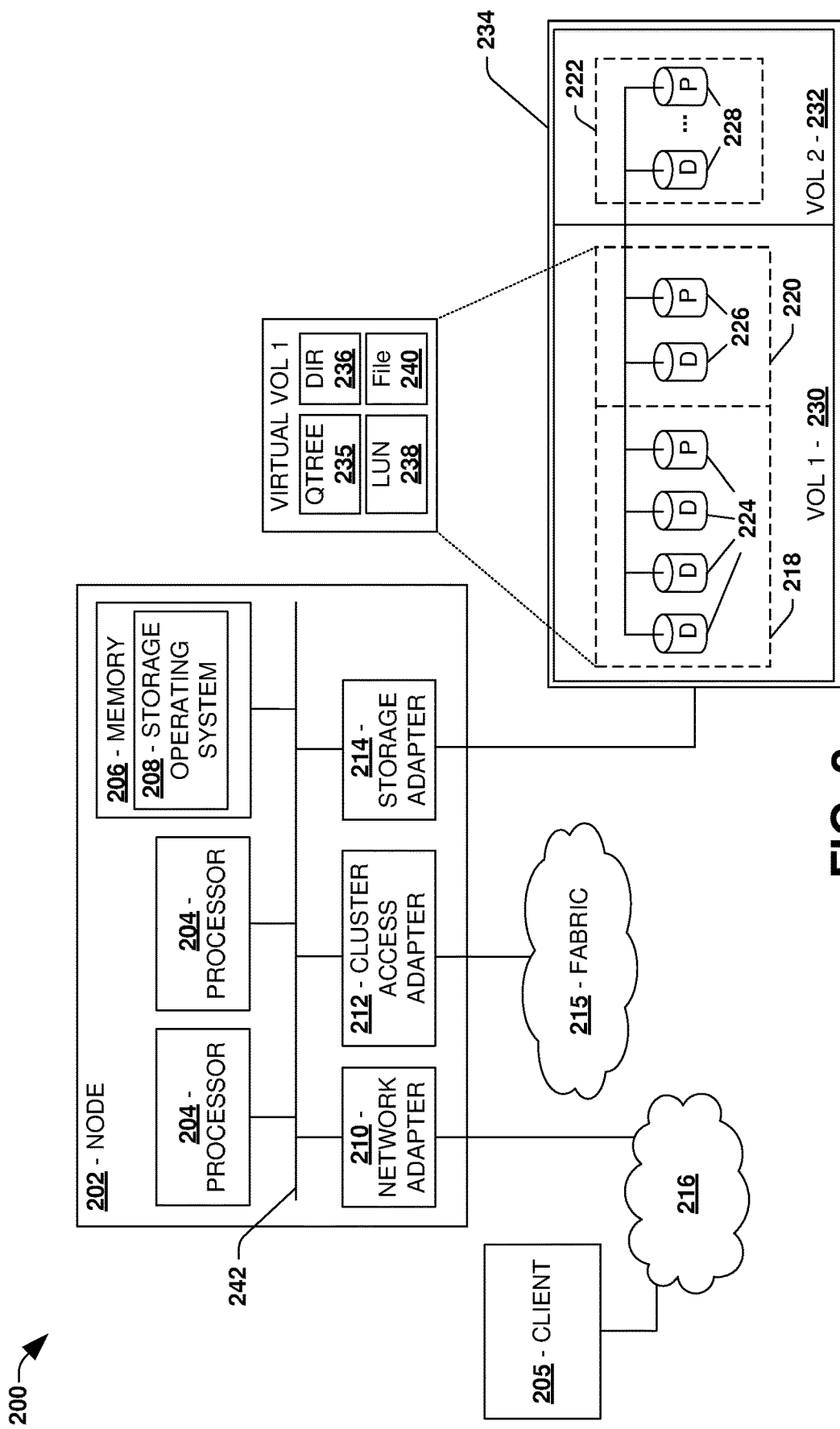
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that managing objects within an object store may be implemented for the data storage system 200. It may be appreciated that managing objects within an object store may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
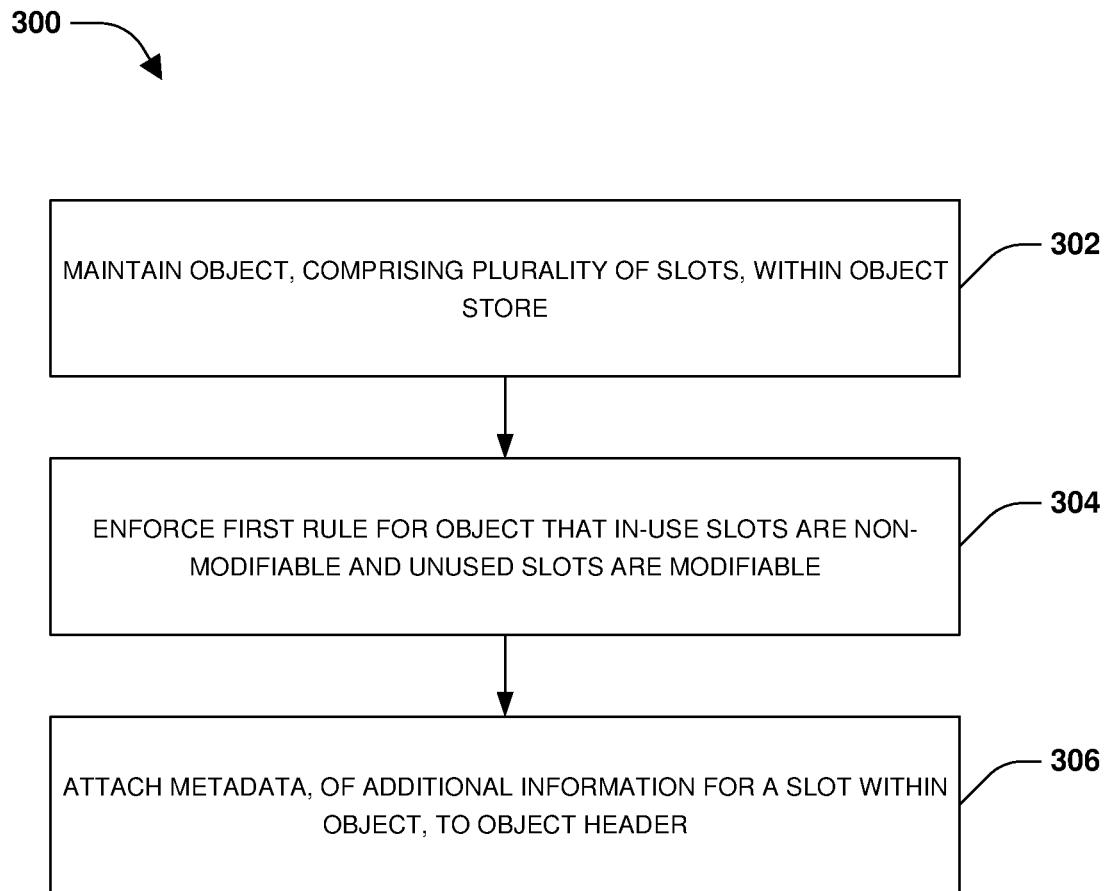
FIG. 3 is a flow chart illustrating an example method for managing objects within an object store, wherein metadata is attached to an object header of an object.
Figure 4:
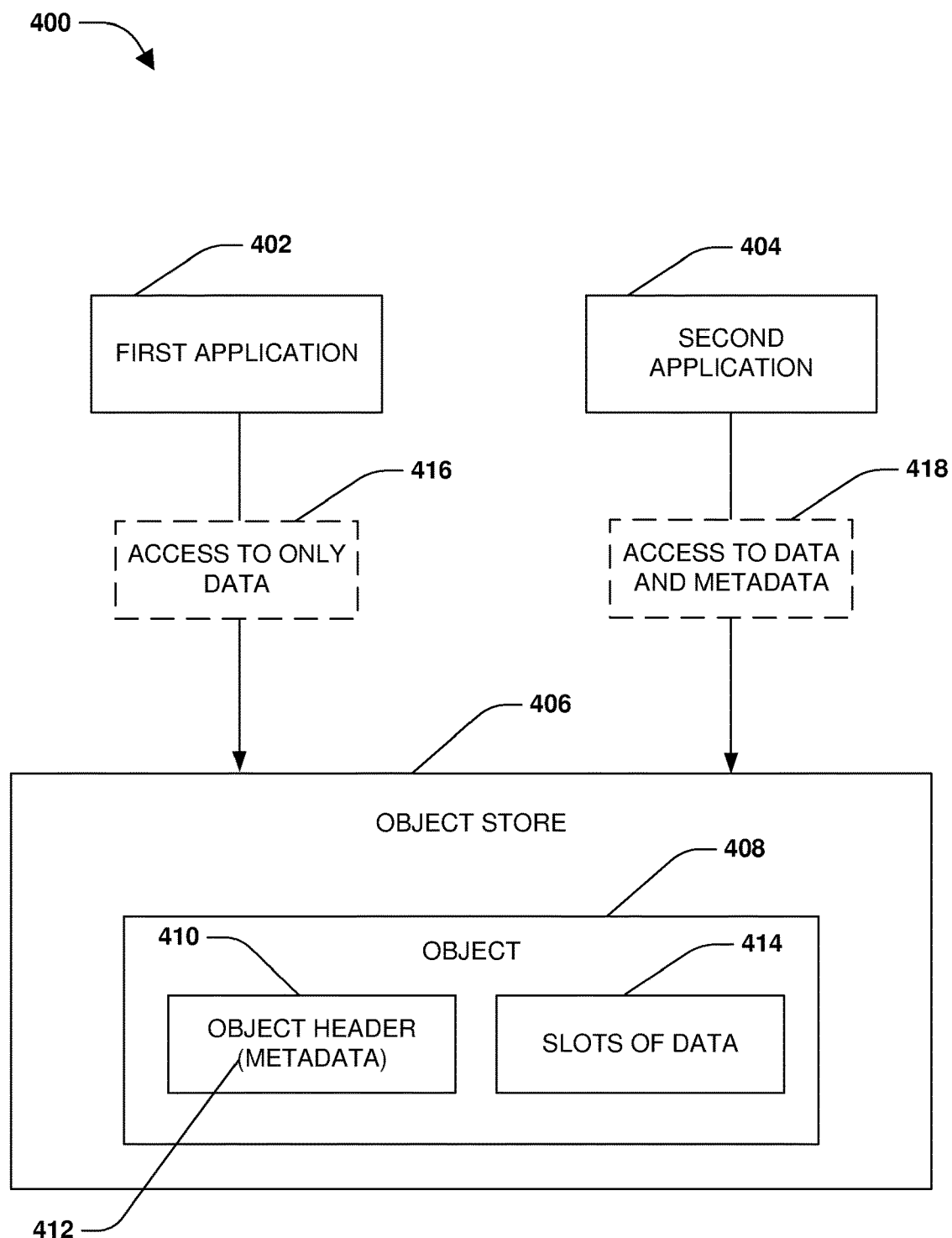
FIG. 4 is a component block diagram illustrating an example system for managing objects within an object store, wherein metadata is attached to an object header of an object.

One embodiment of managing objects within an object store is illustrated by an exemplary method 300 of FIG. 3 and further described in conjunction with system 400 of FIG. 4. A computing device may comprise a node, a storage controller, a storage service, an on-premises computing device, a storage virtual machine, or any other hardware or software (e.g., software as a service). The computing device may store data within storage devices (primary storage) managed by the computing device. The computing device may provide client devices with access to the data, such as by processing read and write operations from the client devices. The computing device may create snapshots of the data, such as a snapshot of a file system of a volume accessible to the client devices through the computing device.

The computing device may be configured to communicate with an object store 406 over a network. The object store 406 may comprise a cloud computing environment remote to the computing device, and is accessible to the computing device over a network. The object store 406 may provide scalable cost effective storage for the computing device and/or other computing devices. Accordingly, various computing devices and/or applications may store data within the object store 406 through objects. For example, a first application 402 executed on a computing device may store data within objects stored within the object store 406. A second application 404 executing on a computing device (e.g., the same or different computing device than the computing device executing the first application) may store data within objects stored within the object store.

At 302, an object 408 is maintained within the object store 406, as illustrated by FIG. 4. The object 408 comprises a plurality of slots 414 for storing user data. The object 408 may comprise any number of slots, such as 1024 slots or any other number of slots. In particular, a slot is used to store a unit of data accessible to applications hosted by remote computing devices, such as the first application 402 and the second application 404. The object 408 comprises an object header 410 used to store metadata 412 for each slot. The object header 410 has a static array of slot context comprising information used to access the user data within the slots. Each slot can represent any length of logical data (e.g., a slot is a base unit of data of the object file system of the object store). Since data blocks for metadata are normalized, a slot can represent any length of logical data. Data within the slots can be compressed into compression groups, and a slot will comprise enough information for how to decompress and return data of the slot.

The slot context may comprise information relating to a type of compression used for compressing data within the object 408 (if any compression is used), a start offset of a slot, a logical data length, a compressed data length, etc. The slot context may be used to access compressed data stored within the object 408. The object header 410 may have a size that is aligned with a start of the plurality of slots 414, such as having a 4 kb alignment based upon each slot having a logical length of 4 kb. It may be appreciated that slots may have any length. The object header 410 comprises various information, such as a version identifier, a header checksum, a length of the object 408, a slot context, and/or other information used to access and manage data populated into the slots of the object 408. The slot context comprises various information about the slots, such as a compression type of a slot (e.g., a type of compression used to compress data of slots into a compression group or an indicator that the slot does not comprise compressed data), a start offset of the slot within the object 408 (e.g., a slot identifier multiplied by a slot size, such as 4 kb), a logical data length of the slot (e.g., 4 kb), a compressed length (e.g., 0 if uncompressed), an index of the slot within a compression group of multiple slots (e.g., 0 if uncompressed), a logical data checksum, etc.

The object 408 may comprise a logical representation of data stored into the object 408 by a remote computing device. The object 408 may comprise any types of data, such as a file, user data, a directory, a read only snapshot of a file system hosted by the remote computing device, etc. Each object within the object store 406 is assigned a unique sequence identifier for uniquely identifying each object.

At 304, a first rule is enforced for the object 408. The first rule may specify that in-use slots of the object 408 are non-modifiable. An in-use slot is a slot comprising data still used and/or referenced by the remote computing device. The first rule may specify that unused slots are modifiable. An unused slot is a slot comprising data that is no longer used or referenced by the remote computing device, such as freed data unique to a snapshot that has been deleted by the remote computing device and thus is no longer used or referenced by the remote computing device.

At 306, metadata 412, of additional information for a slot within the object 408, is attached to the object header 410. The additional information may comprise analytics (e.g., read/write statistics of access to the object 408), virus scan information, development testing data, and/or a variety of other information that can be generated for the object 408 and the data stored therein. In an example, the additional data is generated by a cloud service or application executing within the object store 406. This will offload processing and resource utilization that would otherwise be used by the remote computing device (primary storage system) to perform such analytics and processing.

When the metadata 412 is attached to the object 408, the user data within the slots 414 is retained in an unmodified state based upon enforcement of the first rule. That is, the first rule specifies that in-use data within the slots cannot be modified. Thus, when the metadata 412 is attached to the object 408, slots comprising in-use data are not modified.

When the metadata 412 is attached to the object 408, the meaning and accessibility of the in-use data within the slots 414 is not changed. For example, the first application 402 may have original had access 416 to user data within the slots 414. Once the metadata 412 is attached to the object 408, the first application 402 still retains access 416 to the user data within the slots 414. The meaning and accessible that the first application has to the object 408 is not changed by the metadata 412 being attached to the object 408, and thus the access 416 does not additionally provide the first application 402 with access to the metadata 412 comprising the additional information, such as the analytics. The second application 404 may have created the metadata 412, requested that the metadata 412 be created (e.g., analytics created by a cloud service invoked by the second application 404), or otherwise have some association with the metadata 412. Accordingly, the second application 404 has access 418 to the user data within the slots 414 that the second application 404 always had access to and has access to the metadata 412 to which the second application 404 is associated.

In an embodiment, a second rule is enforced for objects within the object store 406. The second rule specifies that read operations are to be directed to a same version of the object 408. That is, a plurality of version of the object 408 may be maintained within the object store 406. For example, the object 408 may be incrementally updated over time. Because in-use data of the object 408 is not to be modified per the first rule, new versions of the object are created for each incremental update to store new data so that existing in-use data of the object 408 is not overwritten or modified. In this way, a new version of the object 408 is created to comprise new user data that would otherwise overwrite current user data within a current version of the object 408 in violation of the first rule.

In an example of enforcing the second rule, a first read operation is performed to read the object header 410 to obtain slot information of a slot from which data is to be read. A second read operation is performed to read the data from the slot as identified by the slot information. A timestamp comparison is performed to compare timestamp data returned for the first read operation and the second read operation to determine whether the first read operation and the second read operation were executed upon the same version of the object 408 based upon whether the timestamp data matches (e.g., a timestamp may be associated with each object version). If the timestamp data does not match, then the first read operation and the second read operation were executed upon different versions of the object 408, and thus the read operations are retried or failed.

Figure 5:
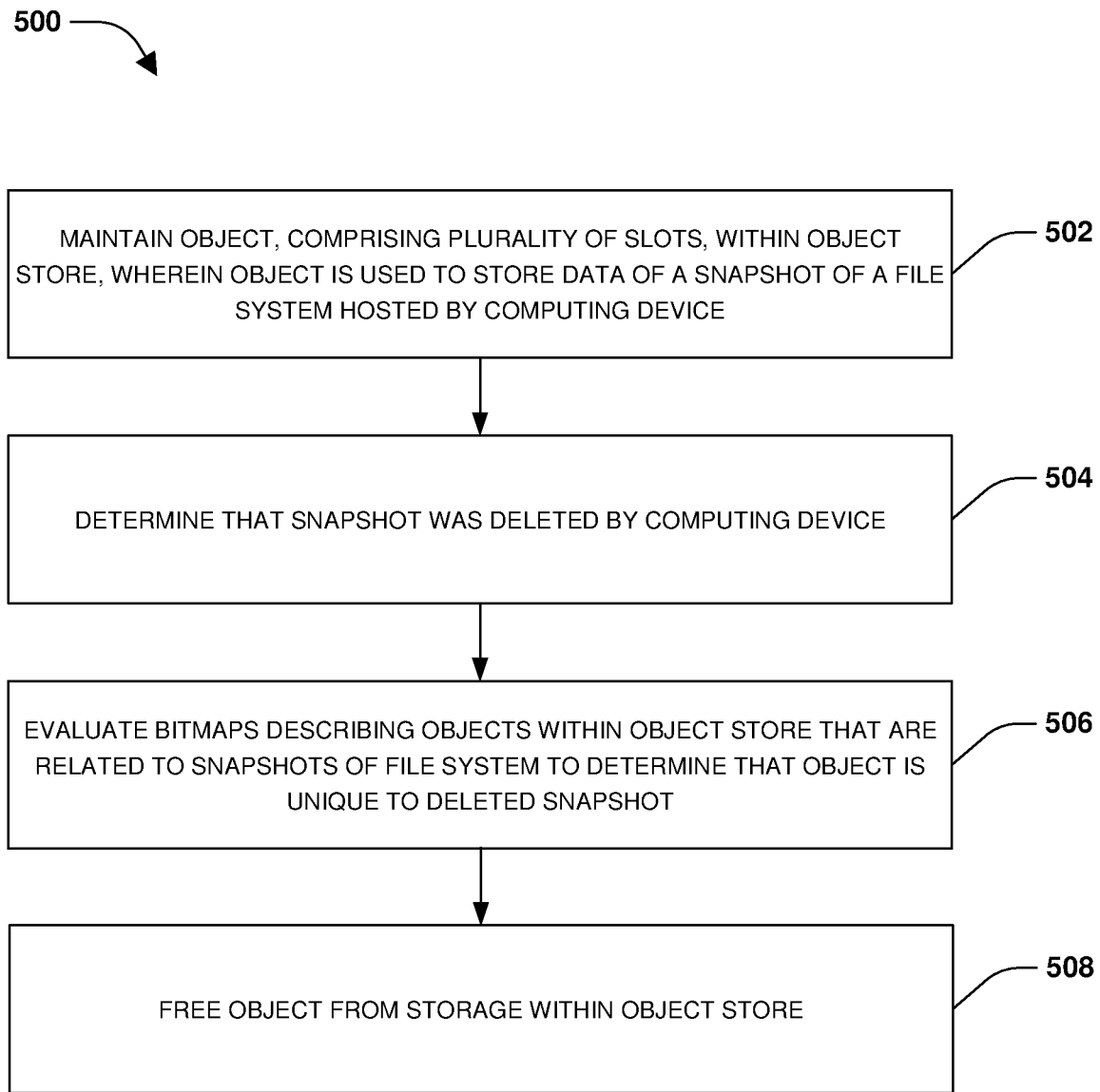
FIG. 5 is a flow chart illustrating an example method for managing objects within an object store, wherein garbage collection is performed for the objects within the object store.
Figure 6:
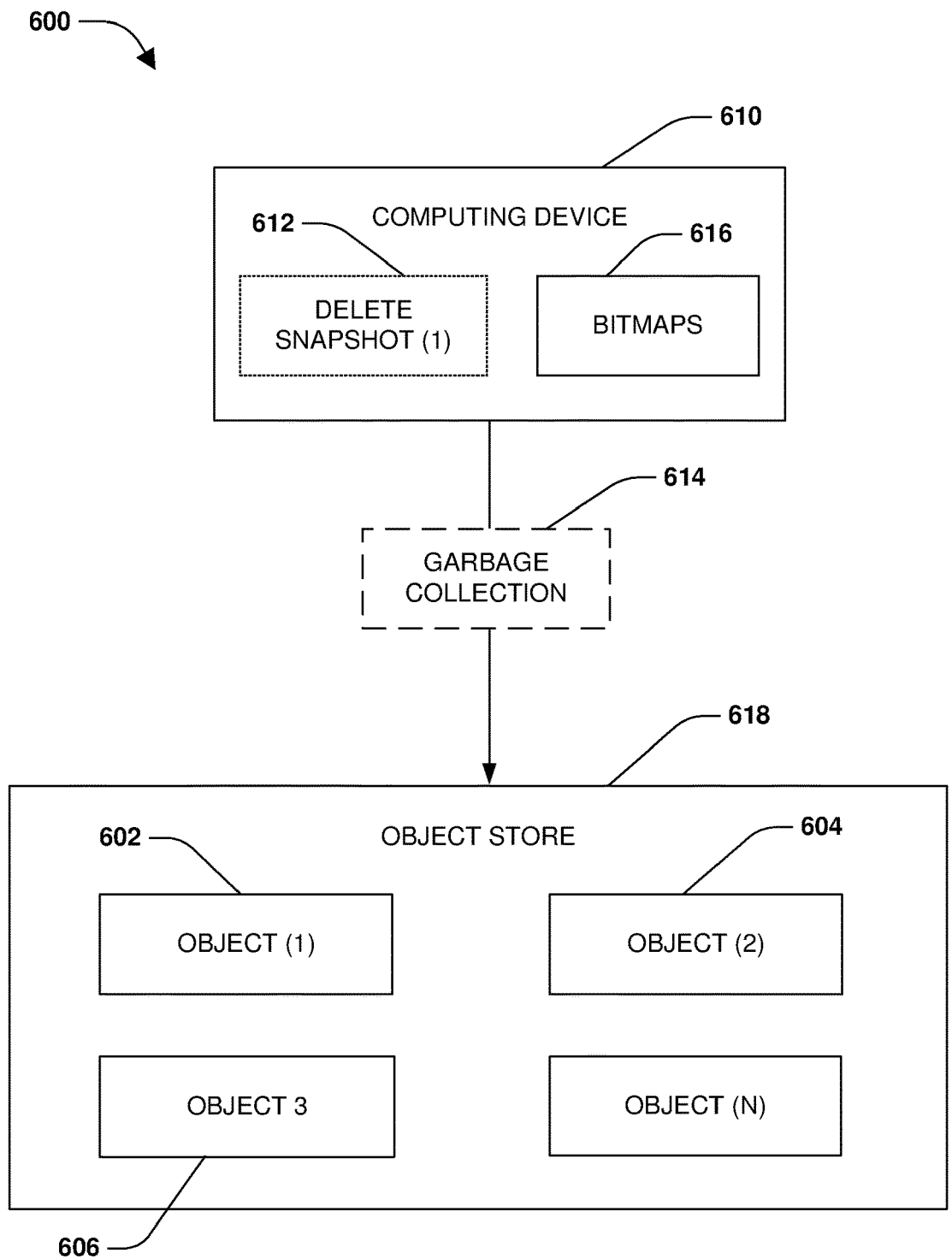
FIG. 6 is a component block diagram illustrating an example system for managing objects within an object store, wherein garbage collection is performed for the objects within the object store.

One embodiment of managing objects within an object store is illustrated by an exemplary method 500 of FIG. 5 and further described in conjunction with system 600 of FIG. 6. A computing device 610 may comprise a node, a storage controller, a storage service, an on-premises computing device, a storage virtual machine, or any other hardware or software (e.g., software as a service). The computing device 610 may store data within storage devices (primary storage) managed by the computing device 610. The computing device 610 may provide client devices with access to the data, such as by processing read and write operations from the client devices. The computing device 610 may create snapshots of the data, such as a snapshot of a file system of a volume accessible to the client devices through the computing device 610.

The computing device 610 may be configured to communicate with an object store 618 over a network. The object store 618 may comprise a cloud computing environment remote to the computing device 610, and is accessible to the computing device 610 over a network. The object store 618 may provide scalable cost effective storage for the computing device 610 and/or other computing devices. Accordingly, various computing devices and/or applications may store data within the object store 618 through objects.

In an example, the computing device 610 may create a first snapshot of data maintained by the computing device 610 within primary storage. The first snapshot may be copied to the object store 618 as a first object 602 comprising slots within which data of the first snapshot are stored. The computing device 610 may create a second snapshot of data maintained by the computing device 610 within the primary storage. The second snapshot may be copied to the object store 618 as a second object 604 comprising slots within which data of the second snapshot are stored. The computing device 610 may create a third snapshot of data maintained by the computing device 610 within the primary storage. The third snapshot may be copied to the object store 618 as a third object 606 comprising slots within which data of the third snapshot are stored. In this way, the computing device 610 may copy snapshots to the object store 618, such that copied snapshot data is stored within objects of the object store 618.

When objects are created and stored to the object store 618, bitmaps 616 are created to describe the objects. In an embodiment, a bitmap for the first object 602 may specify that the first object 602 comprises data of the first snapshot and/or any other snapshots for which the first object 602 is storing data. A bitmap for the second object 604 may specify that the second object 604 comprises data of the second snapshot and/or any other snapshots for which the second object 604 is storing data. A bitmap for the third object 606 may specify that the third object 606 comprises data of the third snapshot and/or any other snapshots for which the third object 606 is storing data. In an embodiment, instead of creating and maintaining a bitmap per object, bitmaps may be created for each snapshot. Thus, a bitmap for the first snapshot may specify which objects store data of the first snapshot, such as the first object 602 and/or any other objects storing data of the first snapshot. A bitmap for the second snapshot may specify which objects store data of the second snapshot, such as the second object 604 and/or any other objects storing data of the second snapshot. A bitmap for the third snapshot may specify which objects store data of the third snapshot, such as the third object 606 and/or any other objects storing data of the third snapshot. In this way, each snapshot may be a snapshot of a file system maintained by the computing device 610, and each snapshot is associated with a bitmap identifying objects within the object store 618 that correspond to (e.g., comprise data of) a particular snapshot. In an embodiment, a single bitmap may be maintained for a single snapshot or multiple snapshots or may be maintained for a single object or multiple objects.

At 502, a determination may be made that the computing device 610 deleted 612 the first snapshot. At 504, the bitmaps 616 are evaluated to determine whether there are any objects that are unique to the deleted 612 first snapshot. For example, the first object 602 and a fourth object may comprise data only of the deleted 612 first snapshot and no other data corresponding to other snapshots or data maintained by the computing device 610. Accordingly, any objects that are unique to the deleted 612 first snapshot, such as the first object 602 and the fourth object, are freed from storage of the object store 618, at 508. Any objects that are not uniquely associated with the deleted 612 first snapshot (e.g., the second object 604 and the third object 606 do not comprise data of the first snapshot and a fifth object comprises data of the first snapshot but also data of another snapshot and thus is not unique to only to the first snapshot), are retained within the object store 618. In this way, a garbage collection operation 614 is performed, such as by a cloud service hosted within the object store 618, to free objects from storage of the object store 618 based upon the objects uniquely corresponding to deleted snapshots maintained by the computing device 610.

Figure 7:
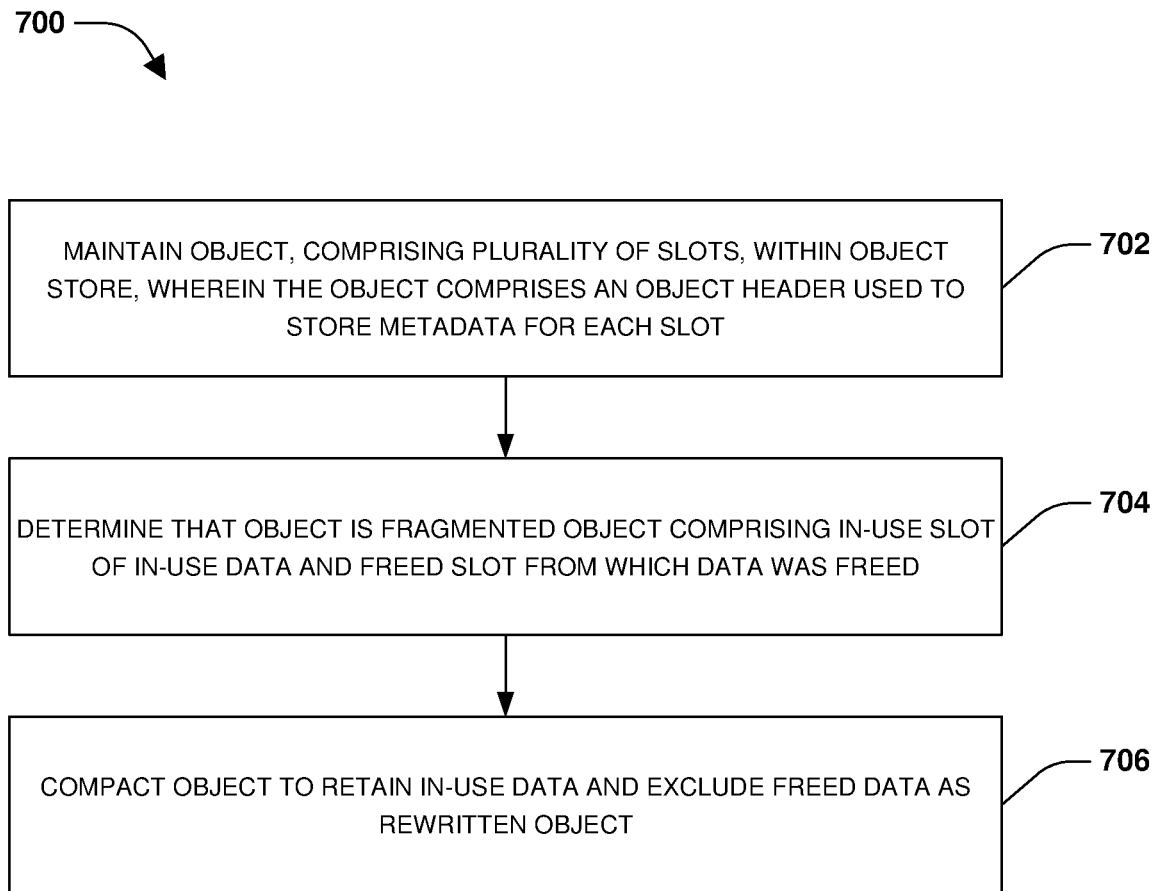
FIG. 7 is a flow chart illustrating an example method for managing objects within an object store, wherein defragmentation is performed for the objects within the object store.
Figure 8:
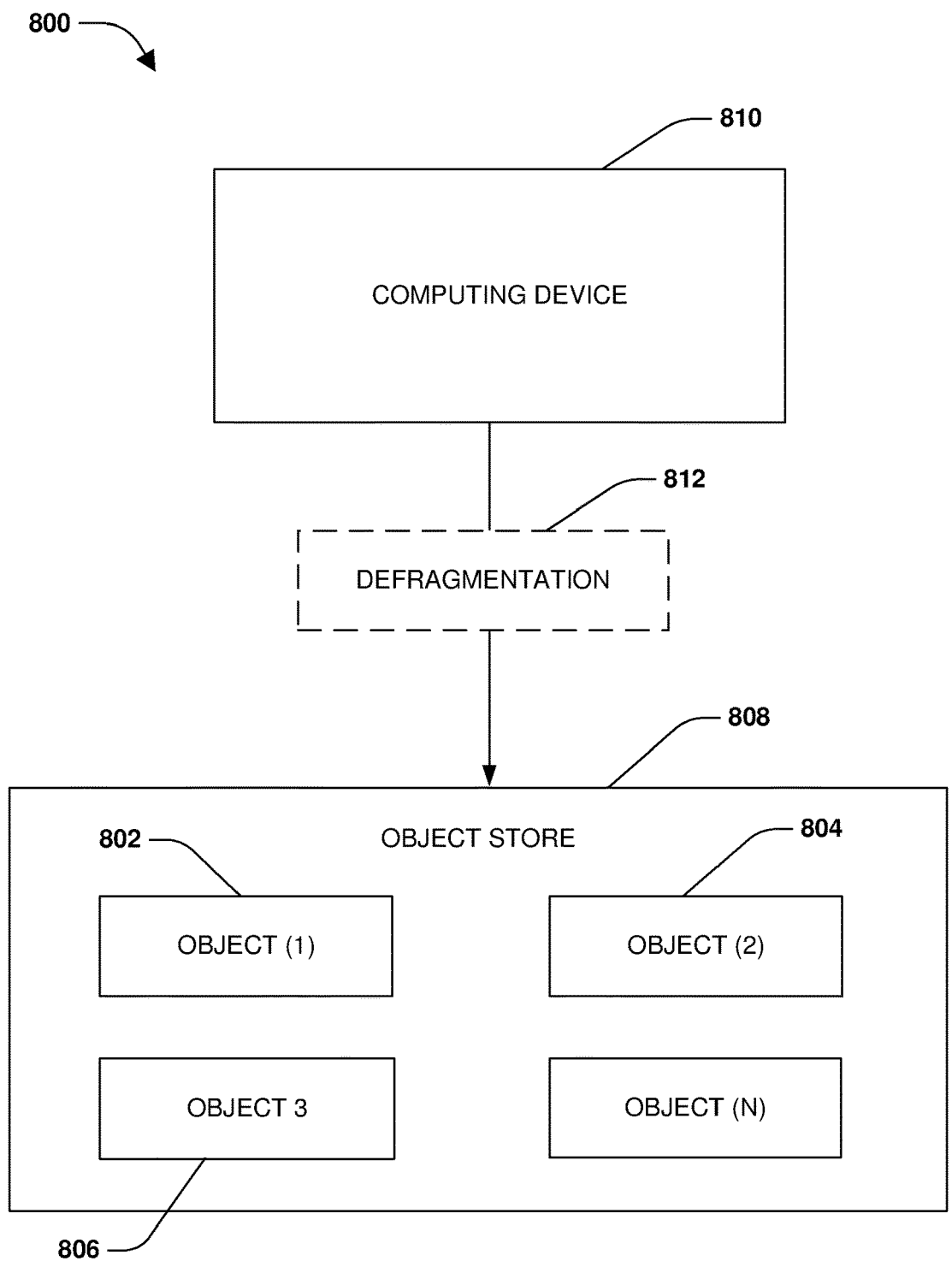
FIG. 8 is a component block diagram illustrating an example system for managing objects within an object store, wherein defragmentation is performed for the objects within the object store.

One embodiment of managing objects within an object store is illustrated by an exemplary method 700 of FIG. 7 and further described in conjunction with system 800 of FIG. 8. A computing device 810 may comprise a node, a storage controller, a storage service, an on-premises computing device, a storage virtual machine, or any other hardware or software (e.g., software as a service). The computing device 810 may store data within storage devices (primary storage) managed by the computing device 810. The computing device 810 may provide client devices with access to the data, such as by processing read and write operations from the client devices. The computing device 810 may create snapshots of the data, such as a snapshot of a file system of a volume accessible to the client devices through the computing device 810.

The computing device 810 may be configured to communicate with an object store 808 over a network. The object store 808 may comprise a cloud computing environment remote to the computing device 810, and is accessible to the computing device 810 over a network. The object store 808 may provide scalable cost effective storage for the computing device 810 and/or other computing devices. Accordingly, various computing devices and/or applications may store data within the object store 808 through objects, such as a first object 802, a second object 804, a third object 806, and/or other objects, at 702.

An object may correspond to data maintained by the computing device 810. For example, the first object 802 comprises slots into which snapshot data, of a snapshot created by the computing device 810 of a file system maintained by the computing device 810, and/or other data is stored. Over time, the computing device 810 may no longer reference or use certain data that was stored into the first object 802. For example, the snapshot may be deleted by the computing device 810. Thus, some of the slots of the first object 802 may be freed slots because those slots comprise data unique to the snapshot that was deleted. The freed slots thus comprise freed data no longer used or referenced by the computing device 810. However, some of the slots of the first object 802 may be in-use slots that comprise in-use data that is still used or referenced by the computing device 810. An object header of the first object 802 may comprise metadata that specifies the locations of the data, such as in-use data, within the first object 802, such as which slots comprise certain data.

Accordingly, defragmentation 812 may be performed for objects within the object store 808 in order to reduce storage utilization otherwise wasted in store freed data within freed slots because the freed data is no longer used or referenced by the computing device 810. At 704, a determination is made that an object is a fragmented object because the fragmented object comprise freed slots from which data was freed (e.g., the first object 802 comprising freed slots storing data of the snapshot that was deleted by the computing device 810) and in-use slots of in-use data (e.g., the first object 802 comprises in-use slots storing data still used or referenced by the computing device 810).

At 706, the object may be compacted to retain the in-use data and exclude the freed data. The object may be compacted to create a rewritten object. The rewritten object comprises the in-use data stored within slots of the rewritten object. The rewritten object excludes the freed data no longer used or referenced by the computing device 810. Because the location of the in-use data may be different in the rewritten object than the object (e.g., the in-use data may be stored in different slots), the metadata within the object header of the rewritten object is updated with the new locations of the in-use data within the rewritten object.

Figure 9:
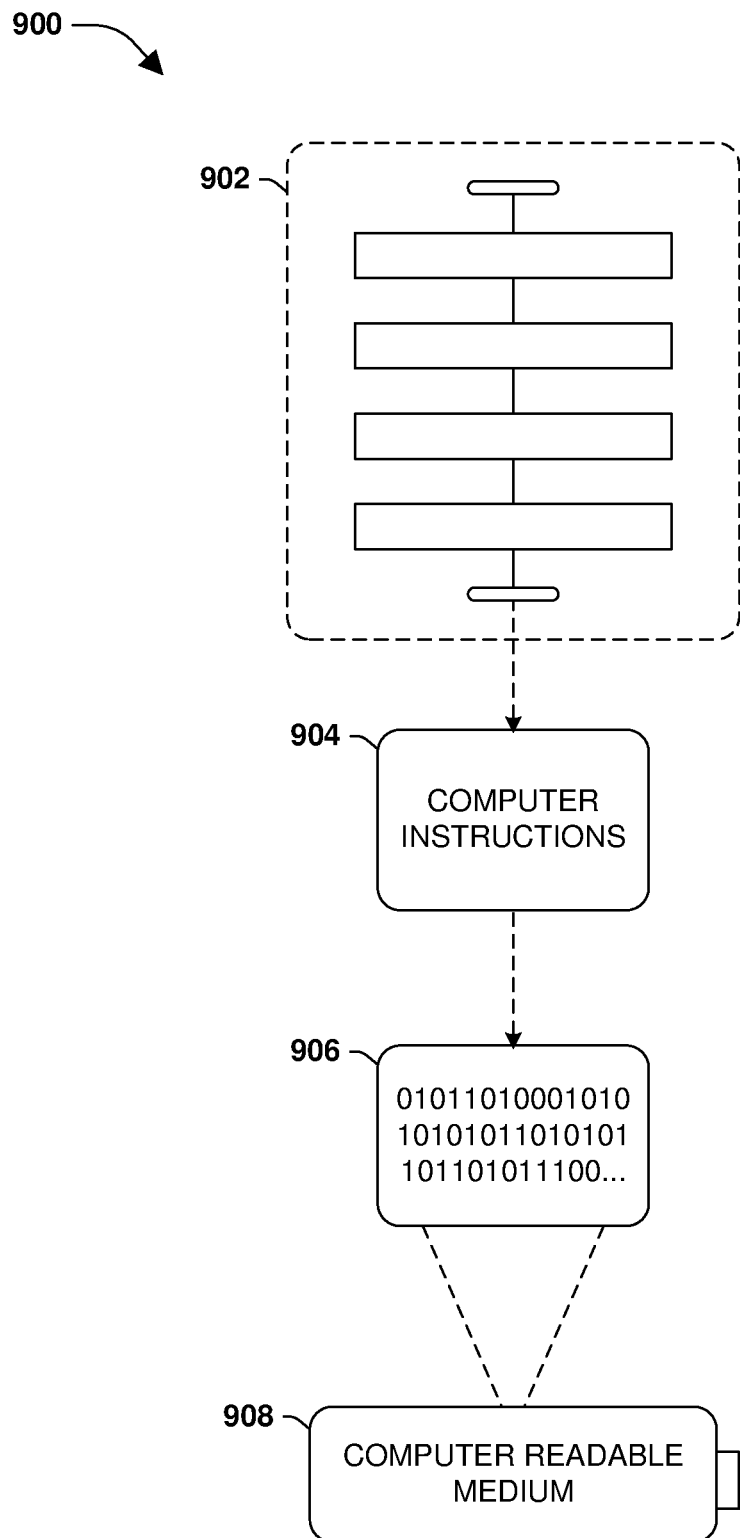
FIG. 9 is an example of a computer readable medium in which an embodiment of the invention may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises a processor-executable computer instructions 904 configured to operate according to one or more of the principles set forth herein. In some embodiments, the processor-executable computer instructions 904 are configured to perform a method 902, such as at least some of the exemplary method 300 of FIG. 3, at least some of the exemplary method 500 of FIG. 5, and/or at least some of the exemplary method 700 of FIG. 7, for example. In some embodiments, the processor-executable computer instructions 904 are configured to implement a system, such as at least some of the exemplary system 400 of FIG. 4, at least some of the exemplary system 600 of FIG. 6, and/or at least some of the exemplary system 800 of FIG. 8, for example. Many such computer-readable media are contemplated to operate in accordance with the techniques presented herein.

Figure 10:
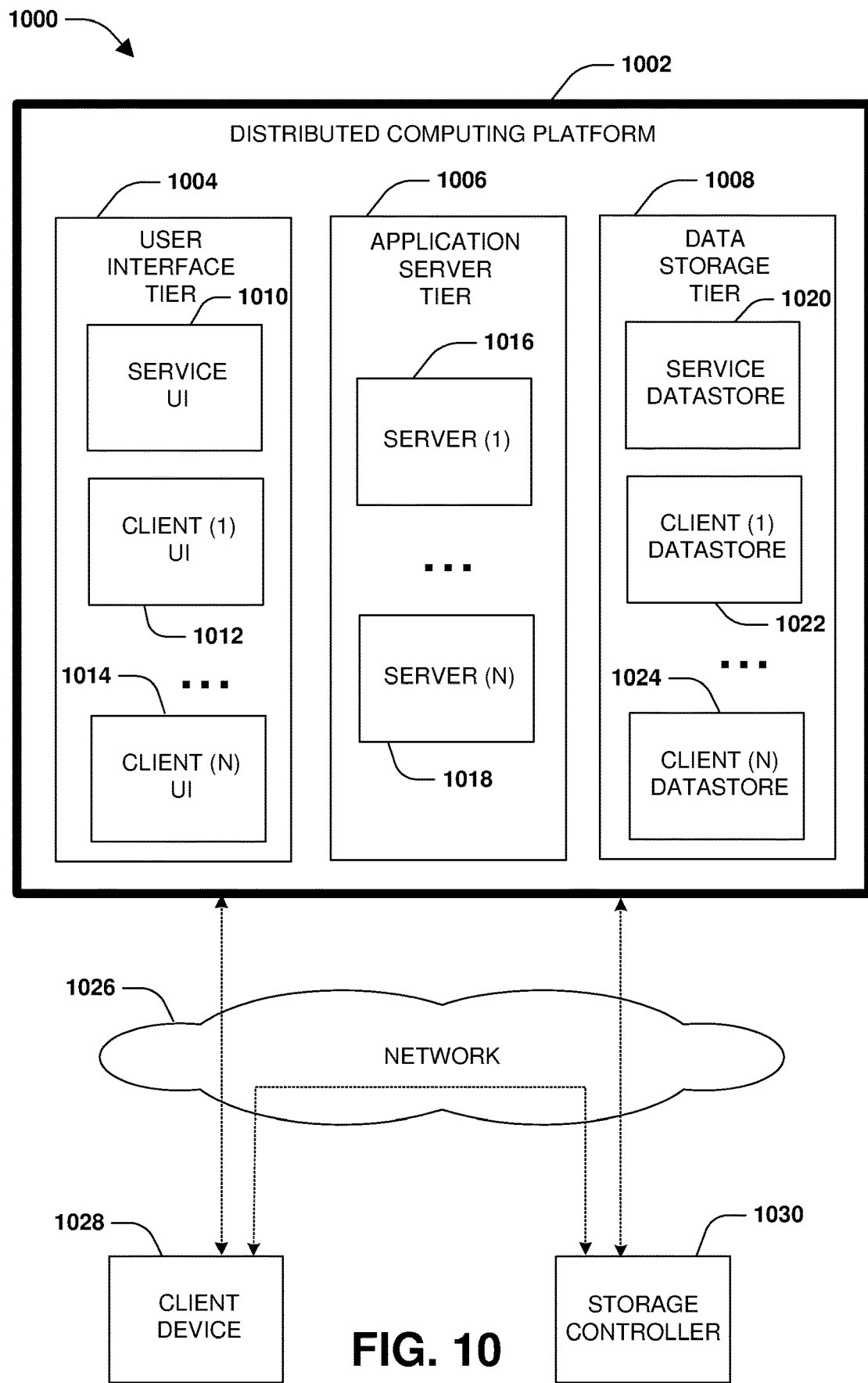
FIG. 10 is a component block diagram illustrating an example computing environment in which an embodiment of the invention may be implemented.

FIG. 10 is a diagram illustrating an example operating environment 1000 in which an embodiment of the techniques described herein may be implemented. In one example, the techniques described herein may be implemented within a client device 1028, such as a laptop, tablet, personal computer, mobile device, wearable device, etc. In another example, the techniques described herein may be implemented within a storage controller 1030, such as a node configured to manage the storage and access to data on behalf of the client device 1028 and/or other client devices. In another example, the techniques described herein may be implemented within a distributed computing platform 1002 such as a cloud computing environment (e.g., a cloud storage environment, a multi-tenant platform, etc.) configured to manage the storage and access to data on behalf of the client device 1028 and/or other client devices.

In yet another example, at least some of the techniques described herein are implemented across one or more of the client device 1028, the storage controller 1030, and the distributed computing platform 1002. For example, the client device 1028 may transmit operations, such as data operations to read data and write data and metadata operations (e.g., a create file operation, a rename directory operation, a resize operation, a set attribute operation, etc.), over a network 1026 to the storage controller 1030 for implementation by the storage controller 1030 upon storage. The storage controller 1030 may store data associated with the operations within volumes or other data objects/structures hosted within locally attached storage, remote storage hosted by other computing devices accessible over the network 1026, storage provided by the distributed computing platform 1002, etc. The storage controller 1030 may replicate the data and/or the operations to other computing devices so that one or more replicas, such as a destination storage volume that is maintained as a replica of a source storage volume, are maintained. Such replicas can be used for disaster recovery and failover.

The storage controller 1030 may store the data or a portion thereof within storage hosted by the distributed computing platform 1002 by transmitting the data to the distributed computing platform 1002. In one example, the storage controller 1030 may locally store frequently accessed data within locally attached storage. Less frequently accessed data may be transmitted to the distributed computing platform 1002 for storage within a data storage tier 1008. The data storage tier 1008 may store data within a service data store 1020, and may store client specific data within client data stores assigned to such clients such as a client (1) data store 1022 used to store data of a client (1) and a client (N) data store 1024 used to store data of a client (N). The data stores may be physical storage devices or may be defined as logical storage, such as a virtual volume, LUNs, or other logical organizations of data that can be defined across one or more physical storage devices. In another example, the storage controller 1030 transmits and stores all client data to the distributed computing platform 1002. In yet another example, the client device 1028 transmits and stores the data directly to the distributed computing platform 1002 without the use of the storage controller 1030.

The management of storage and access to data can be performed by one or more storage virtual machines (SMVs) or other storage applications that provide software as a service (SaaS) such as storage software services. In one example, an SVM may be hosted within the client device 1028, within the storage controller 1030, or within the distributed computing platform 1002 such as by the application server tier 1006. In another example, one or more SVMs may be hosted across one or more of the client device 1028, the storage controller 1030, and the distributed computing platform 1002.

In one example of the distributed computing platform 1002, one or more SVMs may be hosted by the application server tier 1006. For example, a server (1) 1016 is configured to host SVMs used to execute applications such as storage applications that manage the storage of data of the client (1) within the client (1) data store 1022. Thus, an SVM executing on the server (1) 1016 may receive data and/or operations from the client device 1028 and/or the storage controller 1030 over the network 1026. The SVM executes a storage application to process the operations and/or store the data within the client (1) data store 1022. The SVM may transmit a response back to the client device 1028 and/or the storage controller 1030 over the network 1026, such as a success message or an error message. In this way, the application server tier 1006 may host SVMs, services, and/or other storage applications using the server (1) 1016, the server (N) 1018, etc.

A user interface tier 1004 of the distributed computing platform 1002 may provide the client device 1028 and/or the storage controller 1030 with access to user interfaces associated with the storage and access of data and/or other services provided by the distributed computing platform 1002. In an example, a service user interface 1010 may be accessible from the distributed computing platform 1002 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 1012, a client (N) user interface 1014, etc. The client (1) can access various services and resources subscribed to by the client (1) through the client (1) user interface 1012, such as access to a web service, a development environment, a human resource application, a warehouse tracking application, and/or other services and resources provided by the application server tier 1006, which may use data stored within the data storage tier 1008.

The client device 1028 and/or the storage controller 1030 may subscribe to certain types and amounts of services and resources provided by the distributed computing platform 1002. For example, the client device 1028 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 1030 can establish a subscription to have access to certain services and resources of the distributed computing platform 1002.

As shown, a variety of clients, such as the client device 1028 and the storage controller 1030, incorporating and/or incorporated into a variety of computing devices may communicate with the distributed computing platform 1002 through one or more networks, such as the network 1026. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 1002, such as a multi-tenant business data processing platform or cloud computing environment, may include multiple processing tiers, including the user interface tier 1004, the application server tier 1006, and a data storage tier 1008. The user interface tier 1004 may maintain multiple user interfaces, including graphical user interfaces and/or web-based interfaces. The user interfaces may include the service user interface 1010 for a service to provide access to applications and data for a client (e.g., a "tenant") of the service, as well as one or more user interfaces that have been specialized/customized in accordance with user specific requirements, which may be accessed via one or more APIs.

The service user interface 1010 may include components enabling a tenant to administer the tenant's participation in the functions and capabilities provided by the distributed computing platform 1002, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 1008 may include one or more data stores, which may include the service data store 1020 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 1002 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    maintaining an object, comprising a plurality of slots, within an object store, wherein each slot is used to store a unit of data accessible to applications hosted by remote computing devices, wherein the object comprises an object header used to store metadata for each slot;
    creating a cloud block in-use map by walking a file system in a snapshot;
    evaluating the cloud block in-use map to identify a freed slot of unused data no longer referenced by the remote computing devices;
    determining that the object is a fragmented object comprising an in-use slot of in-use data and the freed slot; and
    compacting the object to retain the in-use data and exclude the unused data as a rewritten object based upon a number of in-use slots being less than a threshold.

2. The method of claim 1, comprising:
    maintaining the metadata within the object header to specify locations of the in-use data within the object.

3. The method of claim 2, wherein the in-use data is stored in new locations within the rewritten object, and wherein the method comprises:
    updating the metadata with the new locations of the in-use data within the rewritten object.

4. The method of claim 1, comprising:
    copying snapshot data of a snapshot created by the remote computing device into a set of slots of the object.

5. The method of claim 4, comprising:
    determining that the set of slots are freed slots comprising unused data based upon the remote computing device deleting the snapshot.

6. The method of claim 5, wherein the set of slots are determined to be freed slots based upon data within the slots being unique to the deleted snapshot.

7. The method of claim 4, wherein the remote computing device deletes the snapshot, and the method comprising:
    determining that the set of slots are in-use slots comprising in-use data based upon a second snapshot created by the remote computing device referencing data within the slots.

8. The method of claim 4, wherein the remote computing device deletes the snapshot, and the method comprising:
    determining that the set of slots are in-use slots comprising in-use data based upon data within the set of slots being non-unique to the deleted snapshot.

9. A non-transitory machine readable medium comprising instructions for performing a method, which when executed by a machine, causes the machine to:
    maintain an object, comprising a plurality of slots, within an object store, wherein each slot is used to store a unit of data accessible to applications hosted by remote computing devices, wherein the object comprises an object header used to store metadata for each slot;
    create a cloud block in-use map by walking a file system in a snapshot;
    evaluate the cloud block in-use map to identify a freed slot of unused data no longer referenced by the remote computing devices;
    determine that the object is a fragmented object comprising an in-use slot of in-use data and the freed slot; and
    compact the object to retain the in-use data and exclude the unused data as a rewritten object based upon a number of in-use slots being less than a threshold.

10. The non-transitory machine readable medium of claim 9, wherein the instructions cause the machine to:
    maintain the metadata within the object header to specify locations of the in-use data within the object.

11. The non-transitory machine readable medium of claim 10, wherein the in-use data is stored in new locations within the rewritten object, and wherein the instructions cause the machine to:
    update the metadata with the new locations of the in-use data within the rewritten object.

12. The non-transitory machine readable medium of claim 9, wherein the instructions cause the machine to:
    copy snapshot data of a snapshot created by the remote computing device into a set of slots of the object.

13. The non-transitory machine readable medium of claim 12, wherein the instructions cause the machine to:
    determine that the set of slots are freed slots comprising unused data based upon the remote computing device deleting the snapshot.

14. The non-transitory machine readable medium of claim 13, wherein the set of slots are determined to be freed slots based upon data within the slots being unique to the deleted snapshot.

15. The non-transitory machine readable medium of claim 12, wherein the remote computing device deletes the snapshot, and wherein the instructions cause the machine to:
    determine that the set of slots are in-use slots comprising in-use data based upon a second snapshot created by the remote computing device referencing data within the slots.

16. A computing device comprising:
    a memory comprising machine executable code for performing a method; and
    a processor coupled to the memory, the processor configured to execute the machine executable code to cause the processor to:
        maintain an object, comprising a plurality of slots, within an object store, wherein each slot is used to store a unit of data accessible to applications hosted by remote computing devices, wherein the object comprises an object header used to store metadata for each slot;

create a cloud block in-use map by walking a file system in a snapshot;

evaluate the cloud block in-use map to identify a freed slot of unused data no longer referenced by the remote computing devices;

determine that the object is a fragmented object comprising an in-use slot of in-use data and the freed slot; and compact the object to retain the in-use data and exclude the unused data as a rewritten object based upon a number of in-use slots being less than a threshold.

17. The computing device of claim 16, wherein the machine executable code causes the processor to:

maintain the metadata within the object header to specify locations of the in-use data within the object.

18. The computing device of claim 17, wherein the in-use data is stored in new locations within the rewritten object, and wherein the machine executable code causes the processor to:

update the metadata with the new locations of the in-use data within the rewritten object.

19. The computing device of claim 16, wherein the machine executable code causes the processor to:

copy snapshot data of a snapshot created by the remote computing device into a set of slots of the object.

20. The computing device of claim 19, wherein the cloud block in-use map comprises a bitmap.

* * * * *